(12) United States Patent
Schlager et al.

(10) Patent No.: US 6,780,306 B2
(45) Date of Patent: Aug. 24, 2004

(54) ELECTROIONIC WATER DISINFECTION APPARATUS

(75) Inventors: Kenneth J. Schlager, Elm Grove, WI (US); Stephen H. Gorski, Eagle, WI (US)

(73) Assignee: Bioelectromagnetics, Inc., Hartland, WI (US)

( * ) Notice: Subject to any disclaimer, the term of this patent is extended or adjusted under 35 U.S.C. 154(b) by 258 days.

(21) Appl. No.: 10/074,094

(22) Filed: Feb. 12, 2002

(65) Prior Publication Data

US 2003/0164308 A1 Sep. 4, 2003

(51) Int. Cl.[7] .............................................. C02F 1/461
(52) U.S. Cl. .................... 205/701; 205/742; 205/466; 204/228.3; 204/228.6; 204/229.6; 204/275.1
(58) Field of Search ................. 205/701, 742, 205/466; 204/275.1, 228.3, 228.6, 229.6

(56) References Cited

U.S. PATENT DOCUMENTS 5,738,778 A * 4/1998 Doring ....................... 205/701

6,238,546 B1 * 5/2001 Knieper et al. ............. 205/742

* cited by examiner

Primary Examiner—Arun S. Phasge
(74) Attorney, Agent, or Firm—Godfrey & Kahn, s.c.

(57) ABSTRACT

This invention relates to a method and apparatus for the disinfection of water and wastewater contaminated with bacteria and other microorganisms. The apparatus includes an electrolytic flow cell including electrodes forming a part of flow pipe or open channel through which water or wastewater passes. The electrodes are formed of iron, stainless steel, carbon or copper and connected to a power supply voltage in the range of 20 to 100 volts and establishing a current in the range of 1 to 6 amperes. Disinfection results from either metal ions impacting microbial cells or through the generation of hydrogen peroxide, hydroxyl radicals and hypochlorous acid. When the electrodes are copper, toxic metal contamination limits are established through proper design of the flow cell. An ultrasonic transducer is connected to the electrodes and enhances hydroxyl radical generation.

35 Claims, 4 Drawing Sheets

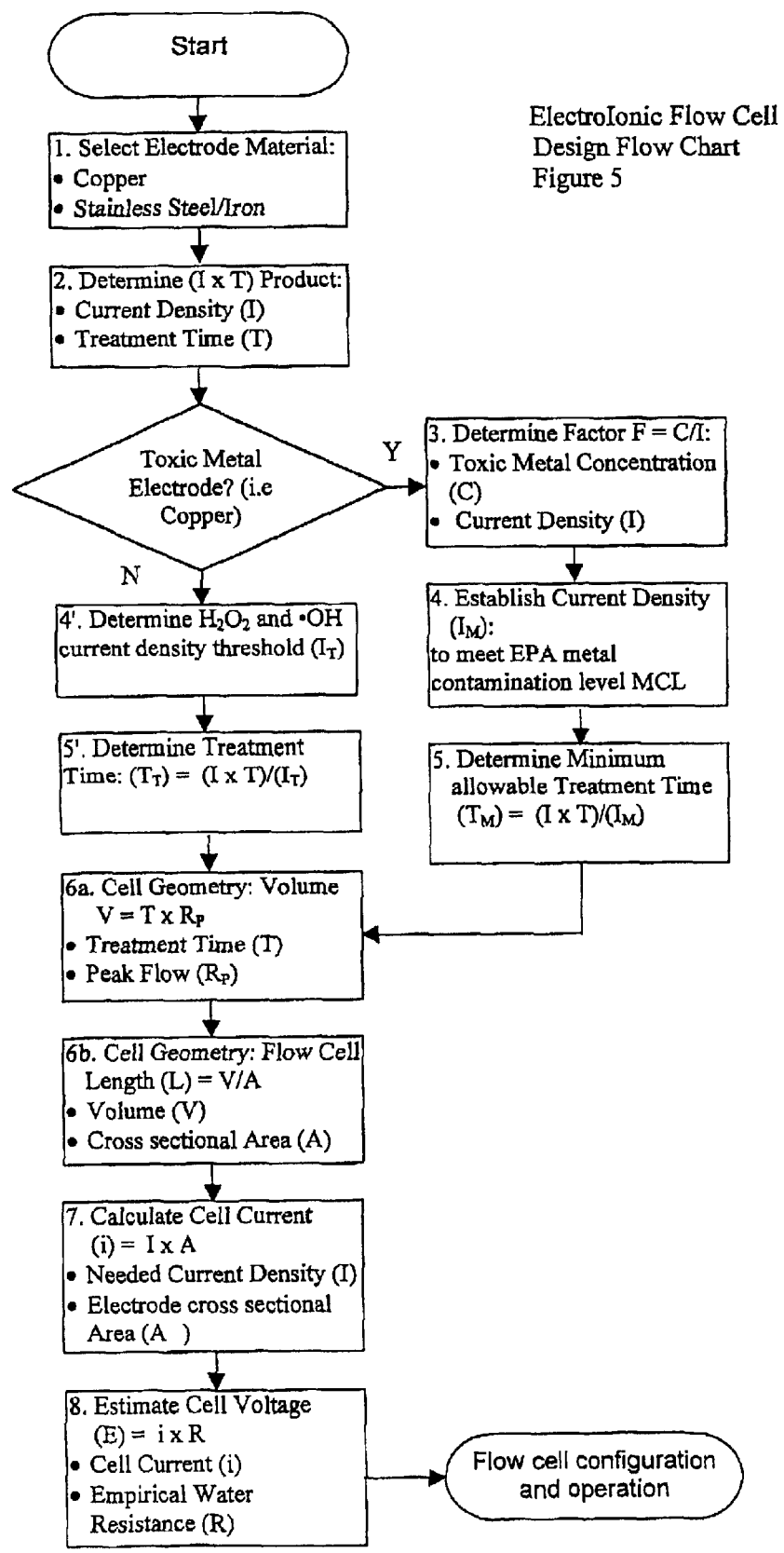

ELECTROIONIC WATER DISINFECTION APPARATUS

BACKGROUND OF THE INVENTION

This invention relates to an electroionic water disinfection apparatus for the inactivation and destruction of pathogenic and other microorganisms present in potable water and wastewater including community water supplies and other large industrial/commercial water and wastewater systems.

Water, both in drinking and wastewater applications, contains microorganisms. Various water treatment systems are provided for disinfecting water to a level suitable for human and animal consumption. Other systems treat wastewater with a reduction in the infectious components to levels which are not suitable for human or animal consumption, but are satisfactory for discharge into various water bodies. Similar water disinfection systems may be applied in both applications to reduce the microbial contaminant level to certain specified governmental standards. Historically, the use of chlorination for disinfection has been pervasive, and in recent years systems employing ozonation and ultraviolet radiation have been commercialized.

Various prior art electroporation systems have been suggested for the inactivation of bacteria from water including wastewater. The technique is generally based on increasing cell membrane permeability using very high voltage electric fields. The water is passed through a disinfection unit having spaced electrodes which are connected to a high voltage source, generally on the order of kilovolts. The high electric field changes the permeability of microbial cells and creates a transient, reversible and/or a permanent and irreversible state of increased porosity. The transient condition usually arises at lower values of electric field intensities. The permanent and irreversible state thus is generally operable at much higher levels. Although such systems have been developed, the required high voltage power supply is very costly and also may raise serious safety problems. Electroporation disinfection systems also consume large amounts of electric power. Electroporation systems have disadvantages not only from the cost, but also from the practicality of the system as applied to large water utility and wastewater applications. Further, requirements for large flow cells within closed systems or open channels limit the current state of the art in electroporation systems.

In summary, such electroporation systems have found use only in limited, point-of-use applications where small pipe diameters are the rule. However, commercially applicable systems for water treatment plants and large-scale wastewater processing have not found significant application.

Alternate systems based on ionic current flow within water have been suggested, particularly for limited flow systems such as swimming pools and other like bodies. These systems, however, use metals such as zinc, copper, lead, silver or the like which introduce toxic ions into the water. This approach raises further questions of acceptability and compliance with federal and state chemical contamination limits.

For example, U.S. Pat. No. 3,936,364 which issued Feb. 3, 1976, and U.S. Pat. No. 4,734,176 which issued Mar. 29, 1988 and U.S. Pat. No. 4,936,979, which issued Jun. 26, 1990, disclose ionic water treatment systems, particularly for disinfecting water in swimming pools and the like. Both U.S. Pat. Nos. 3,936,364 and 4,734,176 disclose the use of metal electrodes including or selected from a silver, tin, lead or copper for establishing an ionic condition for treatment of the water passing between the electrodes. U.S. Pat. No. 3,936,364 which teaches the use of silver electrodes, in the form of spaced electrode silver rods, recognizes the danger of toxicity therein and proposes the necessity of a pair of sequential operating electrode cells, with the first unit including silver electrodes and the second unit especially constructed with steel coated or zinc plated electrodes. The first module had electrodes of silver to remove bacteria, but which introduces toxic silver ions into the water. The second module has silver electrodes coated with steel or zinc which is used to eliminate the effect of the silver ions introduced into the water by the first module. In all of the illustrated embodiments, the first module has silver electrodes and the clarifying module includes zinc coated silver electrodes. The patent discloses various test examples but does not set forth the flow rate or give information as to indicate a practical application of the system. Further, it is questionable whether the use of silver electrodes and/or zinc coated silver electrodes would provide an acceptable system to permit a high flow rate in large pipes or open channels or provide a cost effective and reliable system. The use of silver electrodes would hardly be cost effective even if the system could operate in the large channels and the necessary flow rates of large water systems of municipal size or other commercial installations. U.S. Pat. No. 4,936,979 discloses a system, particularly shown for use in swimming pools, including electrodes formed of copper, lead and zinc. Copper is specially noted as used to ensure removal of algae and is noted as an optional use where algae is not a problem. Lead and zinc are taught as electrodes necessary for disinfection of the water. Lead would be considered a particularly difficult model to use even for disinfection because of the adverse effect of lead in products for human consumption or environments, and the extremely low maximum contaminant levels (MCL) established by the EPA and other governmental agencies.

The treatment of wastewater does not provide water suitable for human consumption, either by drinking, use in cooking, washing of product for consumption and the like. Rather, wastewater is defined by various public and governmental standards so as to permit discharge, when properly treated and disinfected, into relatively large bodies of water, such as lakes and rivers. Generally, wastewater treatment presently requires processing to meet the following basic content specifications: Total suspended solids less than 30 milligrams per liter (mg/L); Biological oxygen demand (BOD 5) less than 30 mg/L; Fecal coliforms bacteria less than 200 colonies per 100 ml. Certain specifications may also require nutrient removal including (1) Nitrogen, (2) Ammonia and (3) Phosphorous.

Various wastewater treatment systems are also available. The systems include an initial primary component involving both physical and chemical treatment to reduce suspended solid materials. A second component includes a biological treatment of the wastewater to remove dissolved organic substances followed by a third step or component to remove bacteria and/or other microbes. This final step may involve one or more of the following treatments: chlorination, ultraviolet radiation or ozonation.

Those three primary alternatives for water/wastewater disinfection all suffer from one or more serious limitations:
1. Chlorination and Its Variants (Chlorine Dioxide, et al.)

In drinking water, chlorination often results in the formation of various organic chlorination byproducts which have been shown to cause cancer and birth defects in children. Also, chlorination at non-toxic dosage levels, is not capable of inactivating Cryptosporidium, a major disease-causing parasite.

In wastewater treatment, chlorination must be followed by dechlorination using sulfur dioxide or an equivalent chemical to comply with discharge chlorine levels. In combination, it is a costly process. Also, recent OSHA regulations establish tight controls for operator safety, and security, storage, and handling of chlorine gas is problematic.

2. Ultraviolet Radiation (UV)

While UV disinfection systems offer the primary current alternative to chlorination, they also have serious limitations. In large pipe/channel disinfection systems, they do not effectively scale up and provide the required disinfection. Also, in high turbidity water or wastewater, disinfection action is erratic and unpredictable due to absorption and scattering of the efficacious light.

3. Ozonation

Ozonation systems are cost effective only in very large water/wastewater treatment plants. Ozone also produces its own carcinogenic disinfection byproducts.

At the same time, the electromagnetic field disinfection alternatives offered in the prior art also have serious limitations:

1. Electroporation

The use of high voltage pulsed or DC electric fields previously discussed for disinfection is practical only in small, point-of-use applications. For example, the use of prior art treatment with electric fields in the one to ten kilovolt per centimeter range extrapolates to tens, possibly hundreds of thousands of volts required using the water flow routes of existing treatment plants. At the treatment plant level, voltage values and power consumption are significantly large and raise concerns for both safety and cost effectiveness.

2. Electrolytic

Previous prior art employing electrolytic cells have relied on the use of toxic metal electrodes which increase metal concentrations in solution that sometimes exceed maximum contamination levels for silver, copper, lead or other metals. This toxicity problem has been generally ignored or presented generally without a proper basis for solving the problem particularly in high flow rate systems by most of the previous art, except for U.S. Pat. No. 3,936,364, previously cited, which provides a second electrolytic cell to remove the toxic metal. The '364 patent, however, does not establish that such metal removal could be accomplished in a cell of reasonable and cost effective size, particularly in high flow rates systems.

In summary, the prior art has considered the problems of disinfecting water with various electroporative or ionic processes to establish a level acceptable for human or animal consumption and of wastewater for discharge into large bodies of water. It is submitted that such suggested systems cannot operate at the flow rate in channel or pipe sizes required for municipal water/wastewater treatment plants or other high volume applications. Further, the prior ionic disinfection art has universally relied on metal electrodes which introduce undesirable and significant toxic metals into the treated water system, and particularly systems which would not function practically in the channel or pipe sizes at the high rates of flow encountered in modem day community water and wastewater treatment systems.

There is a very significant demand and need for a disinfection system for both potable water and for wastewater which is operable to remove bacteria and other microorganisms from water and wastewater, and which is operable at high rates of flow as encountered for commercial and community water supplies as well as various sizes of wastewater treatment systems.

A practical system must thus be operable to treat water supplies at high rates of volumetric flow in large passageways including channels which normally include rates on the order of at least 100 gallons per minute and up to thousands of gallons per minute. The prior art fails to suggest any disinfection systems, and particularly, an electroionic disinfection system, so operable.

SUMMARY OF THE INVENTION

The present invention is particularly directed to an electrolytic ionic cell configuration forming a part of a dynamic flow system which operates at a significantly low voltage and at very high flow rates in large pipes and channels for treating water including potable water and wastewater. The system further permits construction of a relatively small, compact unit for application in various installations, both large and small. The present inventor has found that an ionic cell by appropriate selection of metals for anode and cathode can be operated at a low voltage and current and at relatively high flow rates generally on the order of hundreds of gallons per minutes encountered in commercial and community water treatment systems, with the treatment of the water occurring during a period of 1 to 2 seconds. This short treatment time allows for a commercially practical treatment system with the necessary significant inactivation of $E.\ coli$ and other coliform indicator bacteria and the like in water/ wastewater disinfection systems, and at high flow rates.

In accordance with the teaching of the present system, a high rate flow-through system is provided in which a flow cell carries the water or wastewater between special electrode units connected to a low voltage source generally on the order of 20 to 200 volts, and operating at a relatively low current (1 to 6 amperes) with a significant flow of charged ions in the water electrolyte, and with the flow cell constructed to comply with maximum contamination levels for the metal used. The electrode units are preferably formed from non-toxic materials selected from iron, stainless steel and carbon. However, copper, a metal, is also found to provide a low cost system to remove the microbial contaminants, and by proper design, the toxic level is reduced to a very low level thereby establishing a fail-safe control of the operation.

The essence of this invention in a preferred disinfection system that overcomes the limitations of previous electric field-based systems includes:

1. Cost effective scale-up to treatment plants with large pipe sizes or open channels and high flow rates up to thousands of gallons per minute.
2. Metal toxicity avoidance by either wide flow cell designs which increases contact time and decrease current density and metal concentration levels, or
3. Metal toxicity avoidance by the use of non-toxic electrode materials such as stainless steel, iron or other iron-based material which disinfect through the electrolytic generation of hydrogen peroxide and hydroxyl radicals and not toxic metals.
4. Employing power ultrasonics to enhance hydroxyl generation in the water or wastewater treated.
5. Providing on-line fluorometric monitoring of coliform bacteria as an indicator of microbial load for real-time quality control and electric power savings.

Flow Cell Design

Process system scale-up capabilities are a key property of the present invention. Primary application of the invention emphasizes municipal water/wastewater treatment plants where pipe diameters or open channel widths are sizable, often exceeding 48 inches in dimension and sometimes as large as 8 feet in diameter. Many electro-chemical technologies that are cost effective at a small-scale do not expand cost effectively for larger plant capacities. A dramatic example is provided in a water disinfection application with 4 inch diameter piping and a flow rate of 300 gallons/minute—a relatively small water treatment plant. Tabulated below are the voltage requirements and power usage of both an electroporation-based systems and an electroionic disinfection system.

Electroporation Disinfection System (No Chlorine)

Voltage - 150 kilovolts DC
Field Strength - 15 kV/cm
Power - 7.5 megawatts
Note:
Clearly, an impractical approach.
Electroporation Disinfection System (With Reduced Chlorine)

Voltage - 20 kilovolts DC
Field Strength - 2 kV/cm
Power - 130 kilowatts
Note:
Even with chlorine, a major electric power consumer.
ElectroIonic Disinfection System (No Chlorine) (Present Invention)

Voltage - 83.1 volts DC
Current Density - 2.75 milliamperes/cm$^2$
Current - 1.8 amperes
Power - 0.15 kilowatts The cost effective superiority of the electroionic system of the present invention is quite evident. Comparable systems with no chlorine requirement will favor the electroionic system which requires only 0.002% of the power of the electroporation system. Even the reduced chlorine electroporation system requires more than 800 times the power of the electroionic system. This application involves relatively low conductivity (typically 300 microSiemens/cm) surface source drinking water. Higher conductivity (typically 2000 microSiemens/cm) wastewater with its lower resistance would provide even a worse comparison for electroporation-based water disinfection.

The problems of scale also apply to previous electroionic disinfection art.

Approaches to the problem of metal toxicity are briefly described in the prior art on ionic treatment of water; however, this art only anecdotally assesses toxicity, and does not suggest, point to, or teach a methodology specifically for accounting for metal toxicity in the treatment.

This is considered an untenable position given the wide range of microbial loads characteristic of most water and wastewater treatment plants and the varying treatment levels possibly required.

A single exception is a dual cell system cited at page 2 supra in which a second electrolytic cell is provided for recovery of the metal introduced by a first cell.

U.S. Pat. No. 3,936,364 recognizes the nature and extent of the problem. Even the '364 patent does not substantiate the practicality or cost effectiveness of the metal recovery cell. Electrolytic recovery of trace metals has not been shown to be sufficiently economical when applied to municipal and industrial wastewaters with the high rates of flow such as contemplated for treatment by the present invention.

The Present Invention

The present invention provides an electroionic disinfection system that is scalable to the largest pipe diameters and/or open channel widths encountered in present day water and wastewater treatment plants. It accomplishes this cost effective scale-up while avoiding the problems of metal toxicity, as shown in FIG. 5.

An electroionic flow cell design algorithm is preferably used to provide the required microbial disinfection flow cell design.

A preferred multiple step design algorithm is flow charted in FIG. 5, as follows:

Step 1. Establish electrode metal as either non-toxic iron-based, preferably stainless steel, or toxic copper.

Step 2. Experimentally determine the current density/treatment time product value (I×T) as described in the section following this algorithm.

Step 3. If toxic metal, also experimentally determine a control factor F=C/I, where I is the current density and C is the copper ion concentration as described in the following section.

Step 4. From Factor F, establish a current density $I_m$ which is within the EPA standards for the maximum allowable metal concentration level (MCL) for copper.

Step 5. Determine a Treatment Time $T_m$ for the current density $I_m$ by dividing the original I×T product at step 1 by the current density factor $I_m$.

If an iron based electrode, such as stainless steel, is used, the program steps directly to step 4', which determines the threshold current for $H_2O_2$ and OH radical generation. Treatment time is then calculated in step 5' based on the IT threshold current density.

The cell geometry at step 6a, thus determines the cell volume V, which is equal to: $V=T \times R_p$ where $R_p$ is the peak flow rate and T is either $T_T$ or $T_m$.

The program then determines the length of the flow cell, at step 6b, wherein the length is set L=V/A by the volume V and the cross-sectional area of the cell A.

The program thus, at step 7, calculates the cell current (i) which is equal to the current density I times the cross-sectional area A, where I is the required current density I and A is the area of the electrode.

At step 8, the program estimates the necessary cell voltage E=i×R based on the calculated cell current (i) times the empirical water resistance R, and thereby establishes the cell voltage.

The cell resistance is, and is preferred best determined by empirical measurement rather than the classic conductivity formula which assumes linear current flow. Electrolytic cells exhibit nonlinear behavior with respect to their E/I characteristics.

The above flow cell design procedure provides an electroionic flow cell which furnishes the specified N log disinfection while maintaining toxic metal concentrations within applicable regulatory limits. Current density calculations for non-toxic electrodes are carried out as described with the above description of FIG. 5.

The toxic metal concentration constraint in the above design algorithm represents a primary teaching of this invention. The required I×T product and the current/metal density factor (F) are determined experimentally. Water or wastewater with microbial contamination in the ranges of interest is processed electroionically and the coliform indicator bacteria results are recorded using the membrane filtration (MF) standard method before and after treatment. At the same time, copper metal concentration is recorded for all treatments. For any given flow cell size, the treatment time (T) is fixed for a given flow rate. By varying the input current or the flow rate, the I×T product may be varied and compared with the degree of disinfection. A series of test results for both stainless steel and copper electrodes are tabulated below for wastewater and drinking (Cudahy, Wis.) water. Microbial counts are recorded for total coliforms (TC) and E. coli bacteria (EC). Since all of the counts comply with regulatory limits, the smallest current level may be selected in conjunction with the treatment time employed. Current may then be converted to current density based on the area of the electrodes used in the test. This combination is then the required I×T product.

If toxic (copper) electrodes are involved, a series of I×T products must be calculated in parallel with the copper density readings to allow for the selection of the I×T product that complies with the MCL for copper concentration.

Electrolonic Disinfection (EID) Test Results
Wastewater Disinfection

A series of bench tests demonstrated the disinfection capabilities of the present invention with the above system.

Water Conductivity: 2000–2400 uS/cm

Flow Rate: 25–100 ml/min

Voltage: 3–10 volts

Current: 1–22 milliamp

Input: Secondary Effluent (prior to sand filtering)

| Date | Initial TC* c/100 ml | Initial EC* c/100 ml | Final TC c/100 ml | Final EC c/100 ml | Current (ma) | Voltage (volts) |
|---|---|---|---|---|---|---|
| | | | Stainless Steel Electrodes | | | |
| 8/2 | 360 | 110 | 0 | 0 | 22.0 | 10.0 |
| 9/6 | 4200 | 2500 | 27 | 0 | 22.0 | 10.0 |
| | 4200 | 2500 | 22 | 0 | 22.0 | 10.0 |
| | 3600 | 1900 | 21 | 0 | 22.0 | 10.0 |
| | 3400 | 1800 | 11 | 0 | 22.0 | 10.0 |
| | 4200 | 2500 | 28 | 2 | 22.0 | 10.0 |
| 9/11 | 4200 | 3100 | 3 | 0 | 22.1 | 9.5 |
| | 4200 | 3100 | 12 | 0 | 15.0 | 8.0 |
| | 4200 | 3100 | 31 | 2 | 10.0 | 6.0 |
| | | | Copper Electrodes | | | |
| 9/18 | 4600 | 3100 | 60 | 23 | 3.1 | 1.8 |
| | 4600 | 3100 | 20 | 4 | 5.2 | 3.1 |
| | 4600 | 3100 | 0 | 0 | 10.2 | 6.1 |
| | 4600 | 3100 | 0 | 0 | 15.2 | 8.2 |
| | 4600 | 3100 | 0 | 0 | 20.2 | 10.1 |
| 9/27 | 4700 | 2500 | 0 | 0 | 15.0 | 8.0 |
| | 4700 | 2500 | 0 | 0 | 20.1 | 10.4 |

TC - Total Coliform
EC - *E. Coli* bacteria

Flow Cell Design—Non-Toxic Electrodes

A third key feature of this invention is its capability to provide water/wastewater disinfection with non-toxic electrodes. The electrode materials used, preferably stainless steel, iron or other iron-based metal are non-toxic to cell life in the range of concentrations here. In some cases iron deposits in pipes are known to encourage the growth of a particular form of bacteria.

The bases for stainless steel and related iron-based non-toxic electrode water/wastewater disinfection are the following electrolytic chemical reactions:

$$O_2 + 2H_2O + 2e \rightarrow H_2O_2 + 2OH^-$$

$$F_e \rightarrow F_e^{2+} + 2e$$

$$H_2O_2 + F_e^{2+} \rightarrow F_e^{3+} + \cdot OH + OH^-$$

Both hydrogen peroxide ($H_2O_2$) and the hydroxyl radical (.OH) are strong oxidants with the hydroxyl radical particularly virulent. Hydroxyl radicals are produced by the breakdown of hydrogen peroxide in the presence of ferrous iron ($F_e^{2+}$). The completely internal generation of hydroxyl radicals, one of the strongest disinfectants known in modern chemistry, is a primary feature of this invention. Hydroxyl radicals are also produced by the combination of ultraviolet light and hydrogen peroxide as is well known in the industry. The difference, however, is that an electrolytic cell in the presence of oxygen generates hydrogen peroxide internally while in the UV process, $H_2O_2$ must be added from an external source.

In municipal wastewater, there is also usually a high concentration of chlorides in solution. Their presence results in a second set of disinfection reactions that produce a self-generated chlorine which in turn produces a hypochlorous acid, the active disinfectant in both chlorine gas and liquid sodium hypochlorite (bleach) disinfection.

At the anode of the electrolytic cell:

$$Cl^- \rightarrow 1/2Cl_2 + e^-$$

$$Cl_2 + H_2O \rightarrow HOCl + HCl$$

Hypochlorous acid (HOCl) is the active disinfectant in both the chlorine (gas) and sodium hypochlorite (liquid bleach) disinfection processes.

All of the anodic and cathodic reactions take place near the electrode surface but in the present invention, they are widely dispersed as soon as they are generated by ultrasonic action. Ultrasonically-generated cavitation provides agitation at the electrode surface which assists ion transport across the electrode "double layer" and throughout the electrochemical process [Mason 90].

The above chemical reactions provide the scientific rationale for electrolytic water/wastewater disinfection without the presence of toxic metal ions such as copper or silver.

Experimentation by both the inventor and others has established the beneficial uses of sonication in the 15 kHz–50 kHz range in electrochemical systems [Mason 90]:

1. Degassing

Ultrasonic degassing at an electrode surface prevents gas bubble accumulation interfering with the passage of current.

2. Agitation (via Cavitation)

As previously discussed, ultrasound assists in the ion transport processed dispersing electrode reactions throughout the electrolytic cell.

3. Cleaning

Cavitational collapse at and near the surface will result in continuous cleaning and activation of the electrode.

4. Hydroxyl Radical Generation

Ultrasound acts as a catalyst in the generation of hydroxyl radicals, and it also generates hydroxyl radicals through cavitation.

Cavitation induced by ultrasound results in collapsing bubbles that generate hydroxyl radicals. This action in combination with the ferrous iron reaction with hydrogen peroxide produces an abundance of hydroxyl radicals for disinfection.

Ultrasonic transducers powered by a 20 kHz power supply, for example, will be coupled to both electrodes and the water electrolyte to reap the benefits of ultrasound. From an electroionic disinfection viewpoint, these benefits will be:

1. Clean electrodes greatly reducing system maintenance

2. Reduced electric power from more efficient ion transport and dispersal

3. Enhanced hydroxyl radical generation

A final primary and key feature of the preferred embodiment of this invention is provision for on-line microbial monitoring.

All living cells contain nicotinamide adenine dinucleotides (NADH) which serve as cofactors in many metabolic reactions. Fluorometric measurement of NADH provides a tracking indicator of microbial cell concentration herein called "microbial load." NADH fluoreces at a wavelength of 460 nm when excited by light centered at 340 nm. When used in conjunction with a standard PID (proportional-integral-derivative) process controller, such an on-line monitoring instrument, allows for adjusting the current density level in response to a varying microbial load. Although never used before in the context of electroionic disinfection, a commercially available fluorometric instrument may be used to perform this function. An on-line fluorometric instrument, such as the FluoroMeasure System manufactured by BioChem Technology, Inc. of Malvern, Pa., measures NADH fluorescence as required for this application.

In the context of this invention, this on-line microbiological analyzer provides information for on-line quality monitoring and real time current density control. The microbial load, as expressed microbial cell counts, fluctuates, and the current density is adjusted to achieve the required level of disinfection. On-line microbial load monitoring allows for electric power savings and improved measurement and control of the disinfection process. Sensor probes are placed in the flow stream before and after the electroionic flow cell to provide both microbial load and output quality information.

In a preferred system, a switched bipolar direct current voltage is applied to the electrodes in a continuous flow through process at a flow rate of at least 300 gallons per minute or more. The switched bipolar power source minimizes electrolytic deposits as taught in the prior art. The success of the system appears to be based on the realization that electroionic disinfection involves various factors. As previously noted, the contact time with the contaminated water is a very critical requirement and the appropriate ionic current flow requires a minimum conductivity of the water passing through the cell. The polarity of the DC power supply is switched at a frequency consistent with effective disinfection while preventing buildup of metal deposits on either electrode.

In accordance with the further teaching of the present invention, the electrodes are selected and formed of a group consisting of stainless steel, iron, or copper. A stainless steel electrode is particularly preferred in drinking water because of its non-toxic properties. Copper electrodes may be used in certain applications, particularly wastewater disinfection, because of their ability to reduce the current requirement within the cell as compared to stainless steel while obtaining like levels of disinfection at lower operating cost.

Stainless steel provides a relatively low cost electrode which operates at a reasonable voltage and current level, and produces a highly efficient and relatively low cost cell. Stainless steel will not introduce any toxic ions into the water, in contrast to the prior art systems which disclose use of silver, zinc and the like which are toxic to living cells.

Copper electrodes provide an alternative electrode material with very low power usage costs. The flow cell is constructed to restrict production of copper ions to a level which does not violate water or wastewater maximum contamination levels. The length of the flow cell is extended to allow a current density level consistent with the required current density and time (I×T) product and the EPA limitation of 1 part per million, in accordance with an algorithm as shown in FIG. 5.

The applicant has found that in a cell with a low voltage at a constant current level and with a reasonable level of water conductivity, the disinfection rate is substantially constant for a given water application. In a recent test application for a 4 million gallons per day water treatment plant, a voltage level of 54 volts and a current of 5 amperes were used with electrodes, eleven (11) feet long and one (1) foot wide. As noted previously, however, in certain very low levels of conductivity as in deionized water, the disinfection process is significantly reduced and may be totally eliminated. All wastewater and most potable water have more than sufficient conductivity for this technology.

The choice of materials for the electrodes is a very significant factor in the present invention because the primary mechanism involves a biocidal effect of the ions generated by the electrodes. The process may potentially create a toxic metal problem within the treated water unless the concentration is held below a certain level. The use of the non-toxic materials such as stainless steel, iron or iron based material is therefore a preferred substance where copper will not be accepted.

As noted previously, the current density level and the contact time of the water are most important factors. The electrodes should be formed having a very significant length in the direction of water flow to produce the required contact time and reducing the necessary current level in order to produce an adequate disinfection for practical applications. The use of a stainless steel electrode is considered to provide a very high rate of disinfection in the water from a community supplied system having the usual flow rate of such supply systems and is therefore a particular, unique material. Its mechanism of action does not depend on metal toxicity.

By appropriate dimensional sizing of electrodes and spacing of electrodes in combination with a proper low voltage and current relationship to the size of the water stream which has at least a minimum conductivity level, the desired high flow rates can be established and maintained with the required disinfection. The system is based on the fact that a low voltage drives the required current sufficiently into a relatively low resistant load in order to function as a disinfection process. This not only provides the necessary treatment, but also at a relatively low cost.

The present electroionic disinfection (EID) system readily provides water/wastewater disinfection to the required U.S. EPA and state regulatory limits. A typical wastewater effluent permit limit is 400 fecal coliform organisms/100 ml of water. Drinking water standards are more stringent at the less than 1 fecal coliform microorganism/100 ml of water. In both bench scale and pilot plant testing, the EID system has typically reduced the coliform count to zero or near zero. To provide the necessary microbial cell count, reduction, inactivation rates are expressed in a $\log_{10}$ reduction where 1-log is equivalent to 90% reduction, 2-log (99.0%) and 3-log (99.9%), etc. In a typical wastewater utility with an initial coliform cell count of 2000–4000 cells/100 ml, a 2-log (99.0%) reduction is more than adequate to comply with regulatory limits. In a drinking water utility, where the initial pre-disinfection counts are typically lower (10–100 cells/100 ml), a 3-log (99.9%) may be necessary to reach the 1 cell/100 ml limit. In the subject invention, current density adjustments in response to either off-line or on-line microbial count monitoring allows for continuing compliance at minimal electric power usage. Reference: [Mason 90] Mason, T. J., Ed., *Sonochemistry*, Royal Society of Chemistry, 1990.

BRIEF DESCRIPTION OF THE DRAWINGS

The drawings furnished herewith illustrate preferred constructions of an embodiment of this invention.

In the drawings:

FIG. 5 is a flow chart of a flow cell design.

The flow cells differ in design and construction because water utilities typically employ enclosed piping as water conduits while wastewater treatment plants use open channels.

DETAILED DESCRIPTION OF THE PREFERRED EMBODIMENT

Figure 1:
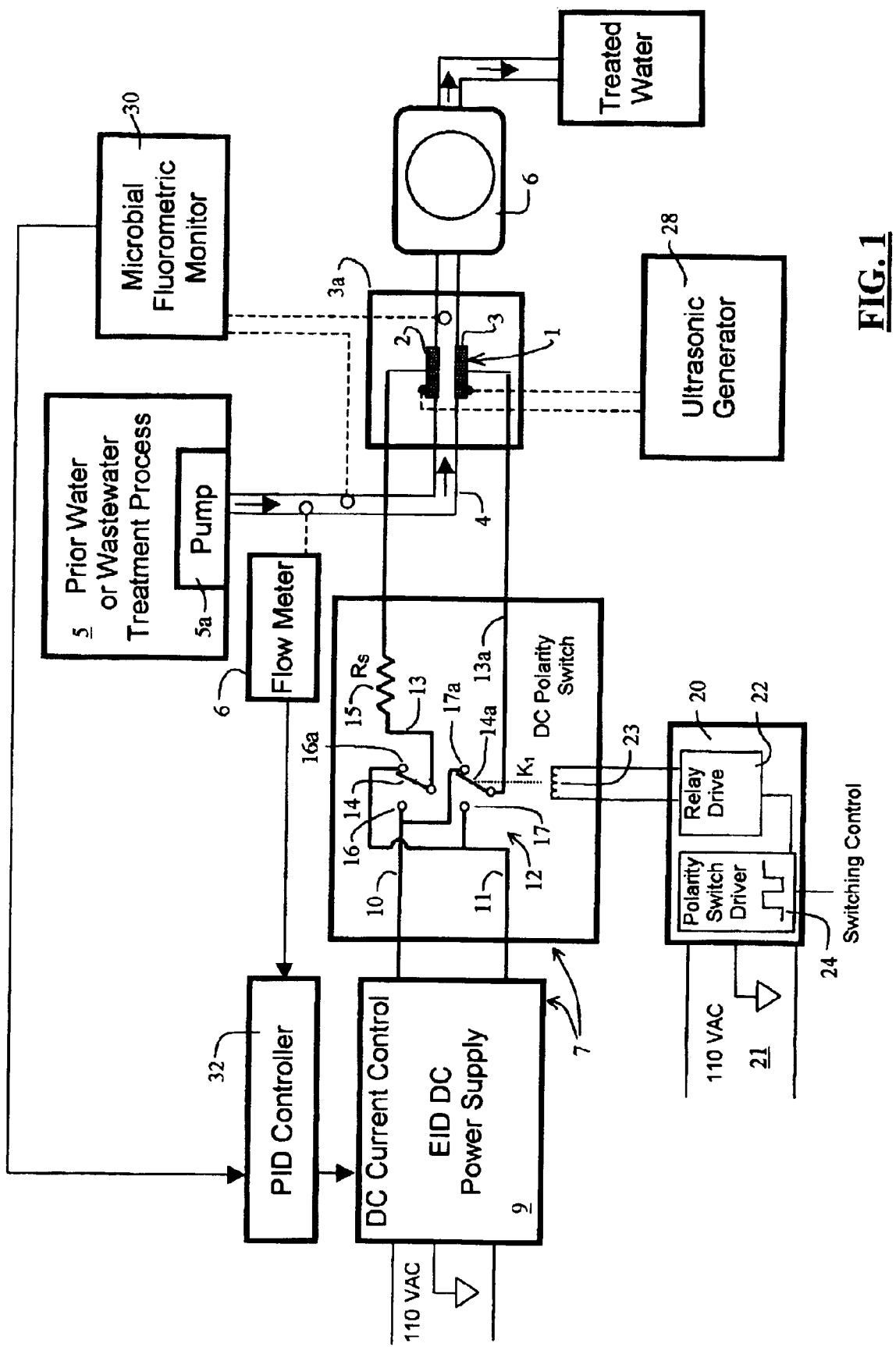
FIG. 1 is an illustration of a flow-through system for water supply or wastewater treatment with water disinfection in accordance with the present invention.

Referring to the drawings and particularly to FIG. 1, an electroionic disinfection flow cell 1 is illustrated consisting of a pair of spaced electrodes 2 and 3 housed within a cylindrical (water) or rectangular housing (wastewater) structure connected to a water pipeline 4. The line 4 is connected in a flow-through piping, or open channel, to the prior stages of a water or wastewater treatment system.

Figure 3:
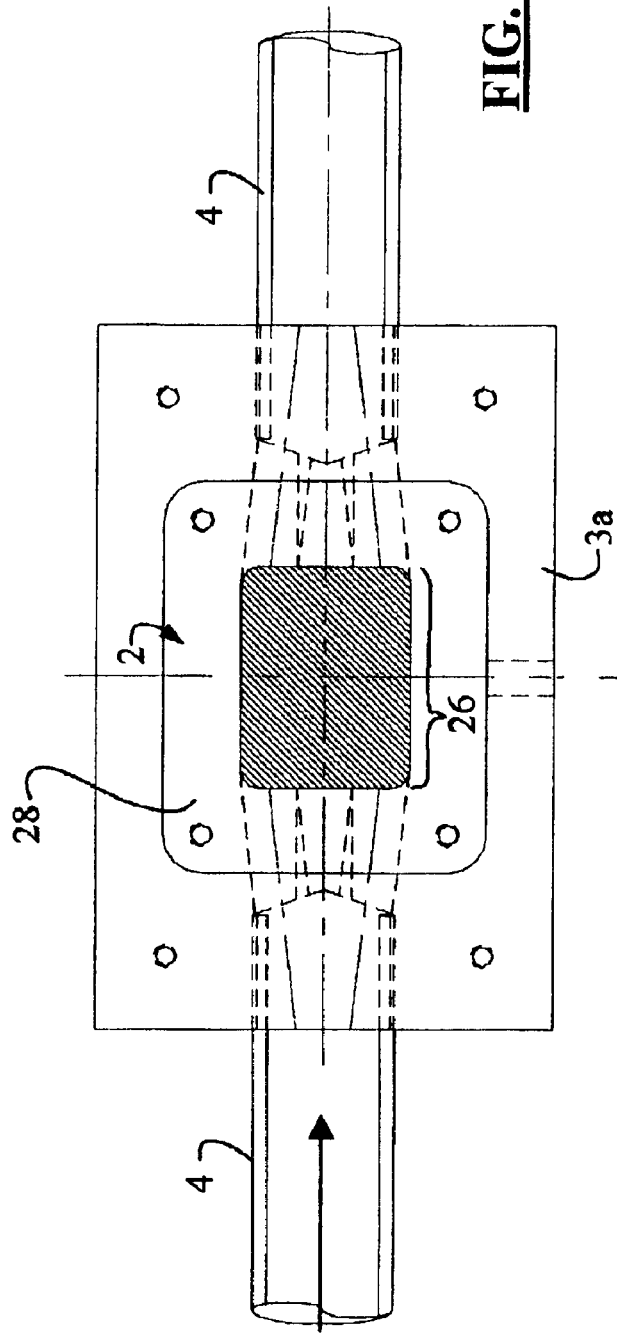
FIG. 3 is a side view of the flow cell.
Figure 2:
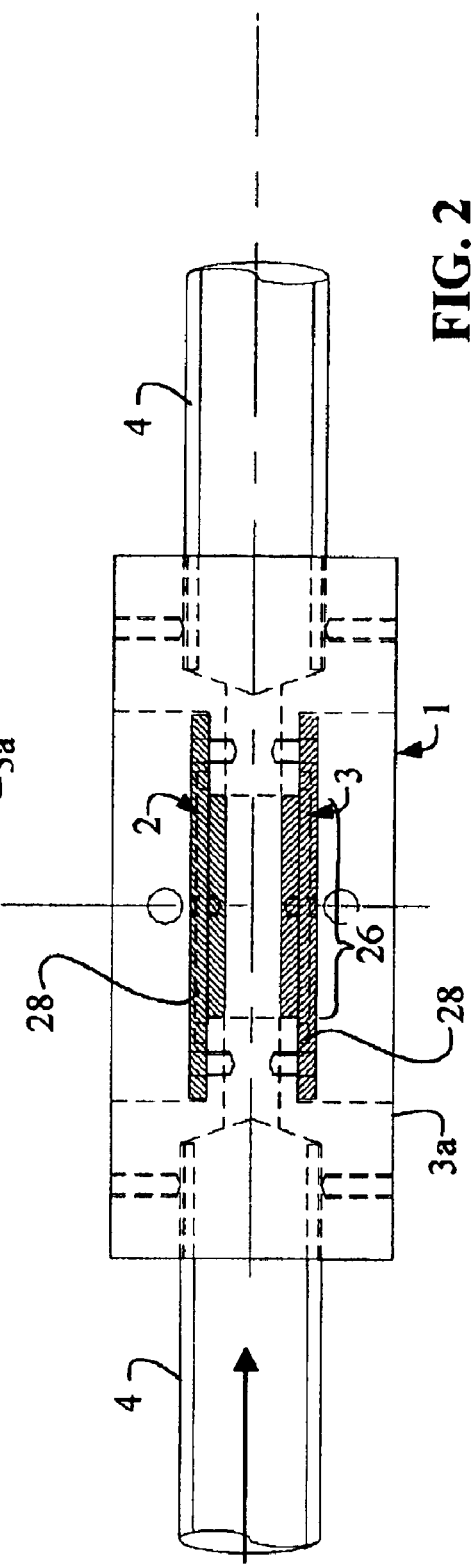
FIG. 2 is a top view of a water utility flow cell.

FIGS. 2 and 3 are views illustrating a construction of the electrodes within a water utility flow cell shown in FIG. 1.

Figure 4:
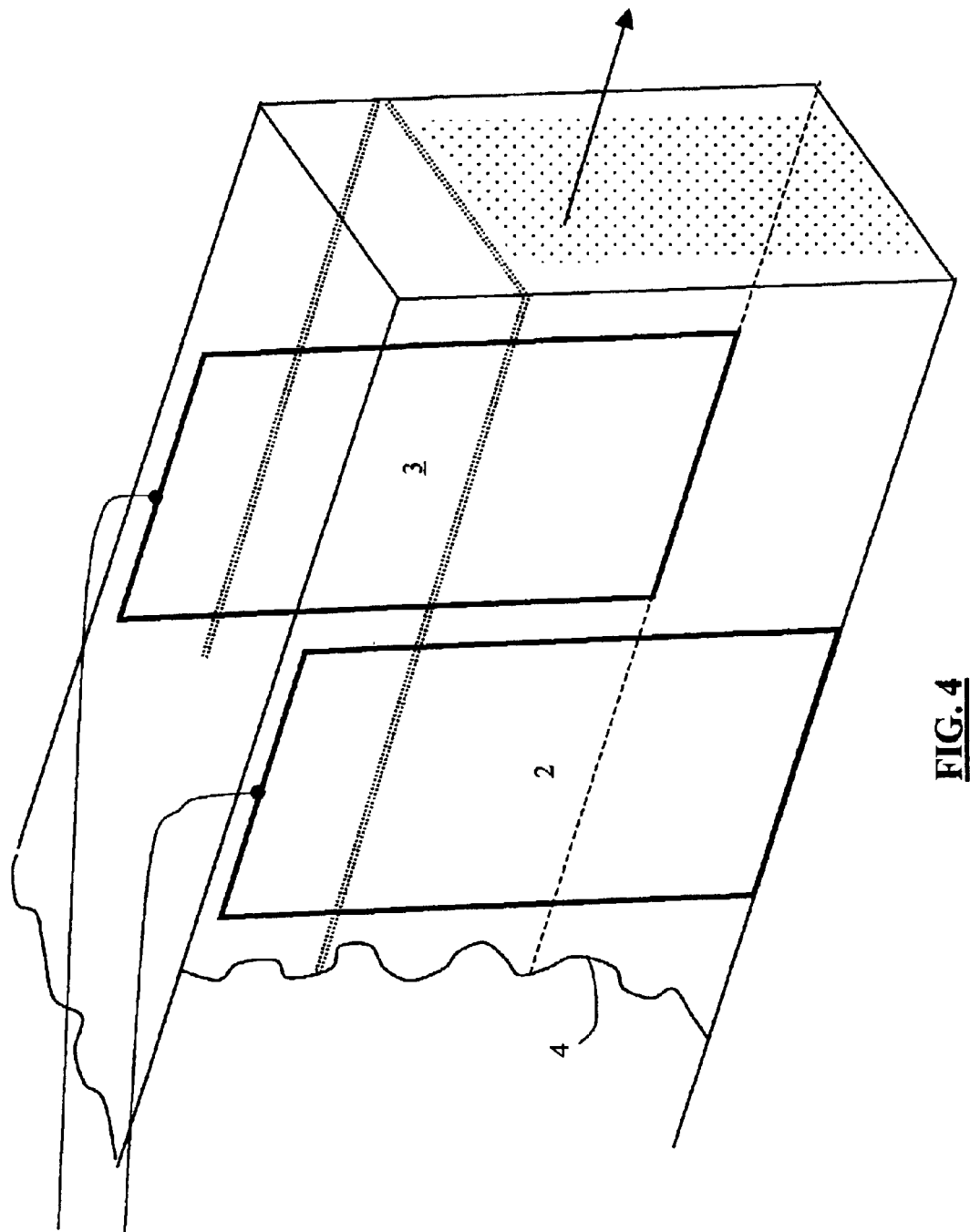
FIG. 4 is a diagramatic view of a wastewater utility flow cell.

FIG. 4 illustrates a typical wastewater flow cell with similar electrodes in place.

In a wastewater utility, line 4 would typically represent an open channel. In a water utility, line 4 is usually a pipe. In a water utility, an external pump 5a in a prior treatment processor unit 5 propels water through the flow cell. In a wastewater treatment plant, a gravity flow scheme from a processor unit 5 is typically employed.

In either instance, the flow rate maybe controlled externally by suitable means. A flow meter 6 is sometimes installed to allow for current density adjustments if the flow rate varies significantly in day-to-day operation. In many utilities, however, flow rate variations are small so that flow rate control is not required. Depending on the size of the water utility plant, average flow rates can vary from as low as 25 gallons/minute to thousands of gallons per minute in a major city installation. The flow cell 1 is connected to a direct current power supply system 7 through a polarity switching circuit.

The illustrated power supply system 7 operates from a 110 volt AC single-phase power line source with an AC/DC converter 9 establishing a DC power supply generating a DC output at lines 10 and 11, with a current at a selected level and a voltage typically on the order of 100 volts or less.

A DC polarity switch unit 12 interconnects input lines 10 and 11 of the DC power supply to the lines 13 and 13a connected to the electrodes 2 and 3, respectively, of cell 1. The switching unit is illustrated as a well known switch construction including a double pole switch assembly with separate contact arms 14 and 14a connected respectively to lines 13 and 13a. A resistor 15 is connected in line 13 in accordance with usual constructions. The switch unit includes like paired contacts associated with each contact arm. Contact arm 14 selectively engages a contact 16 connected to line 10 and alternately a contact 16a connected to line 11, and contact arm 14a is connected respectively to a contact 17 connected to line 11 and alternately a contact 17a connected to line 10. Thus, the switch unit 12 in the full line illustrated position has a first polarity connection made across the flow cell 1. With the switch arms 14–14a operated to the alternate position engaging contact 16 and 17, a reverse polarity of voltage is applied to the cell 1. The position of the switch arms is controlled by a switching control unit 20 which is connected to a low voltage 120 AC supply 21. The switching control unit includes a relay driver 22 coupled to a positioning coil 23 connected to the arms 14 and 14a for corresponding positioning thereof The switching control 20 includes a polarity switch driver 24 alternately energizes the relay and thus coil 22 to move the contact arms between the alternate positions.

This switch provides for an alternate polarity potential created between the electrodes 2 and 3 to produce the necessary ionic action while minimizing anodic and cathodic effects on either electrode. The electrodes 2 and 3 are preferably constructed as shown in FIGS. 2 and 3 depending on the water or wastewater application.

The structure of each electrode 2 and 3, and particular the material thereof, is a critical factor. Applicant has found that stainless steel electrodes provide a low cost and highly effective disinfection cell and thus constitute a preferred material. Stainless steel electrodes do not introduce any damaging toxic ions into the water and operate at reasonably low voltages and currents (typically less than 100 volts and 5 amperes). Neither stainless steel nor iron electrodes introduce non-toxic ions as a vehicle of disinfection. Rather, use of either material in an electrolytic configuration generates hydrogen peroxide and hydroxyl radical disinfectants as previously described. The electrodes are readily formed with an appropriate area and operable at relatively low current densities such as 12 milliamperes/cm$^2$ to obtain a relatively high reduction in bacteria. For example, stainless steel electrodes readily provide a 3-log inactivation of a coliform bacteria indicator operating at the flow rate of 300 to 3000 gallons per minute with a flow cell of appropriate construction to establish the necessary contact time.

The current density range may vary with the application within a range of substantially 0.2 to 50 ma/cm$^2$ in various systems within the scope of the present invention.

Copper electrodes have also been found to provide a satisfactory construction for the same flow cell and other conditions, with proper design. The advantage of copper is a reduction in the current density level to obtain the same level of disinfection as with a stainless steel cell. Copper electrodes, therefore, provide a significant reduction in the cost of system operation, with a flow cell design which complies with the MCL for copper concentration, such as shown in the flow chart of FIG. 5 and the described algorithm.

The key role of the electrodes and the water conductivity has been further demonstrated by providing a standard electrode cell such as described herein in which successive dilution of the water reduced the conductivity as it passed through the cell without any significant change in the disinfection rate or level when the water conductivity varied between levels of 2400 uS/cm to 300 uS/cm. A water conductivity of generally above 50 uS/cm is needed. When the water conductivity was dropped to a very low figure, such as 10 uS/cm, there was no significant disinfection of the water which passed through the identical cell. Conductivities at this level are not encountered in either wastewater or water utilities but only in distilled or deionized water.

These and other tests have established that the water disinfection is a highly multi-faceted process with the conductivity of the water, the size and material of the electrodes in combination with the contact time are dominant in the successful construction of an electroionic cell unit. Other considerations such as the electrode design construction as discussed above, are and must also be given serious consideration in the application of electroionic processing of water, particularly potable water and wastewater.

The electrodes 2 and 3 form the inner wall of the flow cell 1 as shown in FIGS. 2 and 3. Each electrode is a flat plate having dimensions corresponding to the pipe or open channel configuration. The length 26 of the electrodes is selected in accordance with the maximum flow rate of the water to be processed, the conductivity of the water and the necessary contact time. The disinfection process is the result of ionic current acting upon the bacteria within the water with a sufficient contact time to properly inactivate microorganisms present. The electrode length establishes the contact time available for any given flow rate. With the high flow rates of the various drinking water and wastewater treatments, sufficient current density is required to accomplish the required level of disinfection. As noted previously, the contact time required is dependent upon the current density level within the cell and the degree of disinfection needed. The electrode length 26 is therefore based on the flow rate and the necessary current density established.

Disinfection is based on either toxic metal ions or $H_2O_2$ and OH radicals disinfectants engaging the bacteria. By increasing the electrode length, the current density level may be reduced, with a corresponding reduction in the cost of system processing, while maintaining the necessary contact time for proper treatment of the water.

The current supplied to the cell preferably adapts to varying microbial loads, as detected by a microbial monitor 30 shown in FIG. 1. The current adjustment minimizes the power consumption; and thereby the power costs based on the on-line measurements of coliform bacteria described below.

The system is further subject to the usual periodic laboratory testing of the system in the United States as required by the U.S. Environmental Agency and state regulatory agencies.

In the illustrated embodiment, an ultrasonic transducer unit 28 is coupled to electrodes 2 and 3. The transducer unit 28 will contribute to maintaining the electrode surfaces clean of matter in the water, thereby minimizing maintenance of the system and contributing to an efficient transfer of energy at the interface of the electrode and the electrolytic water. The latter condition allows for a lower current density with a reduced power requirement.

In addition, the ultrasound applied to the electrodes functions to further reduce the hydrogen peroxide ($H_2O_2$) to form hydroxyl radicals. Such a breakdown will normally occur without ultrasound, but the ultrasound activities significantly enhances the process. Both are very strong oxidants with the hydroxyl radical being a particular virulent element as previously noted.

Although particularly applicable to high flow rate systems, such as community potable water supplies, various high volume wastewater applications and the like, the system may also be readily used and advantageously for other more limited water systems such as swimming pools, and particularly large public pools. It, of course, may also be used in other systems where the specification may not be as highly regulated or as limiting as that provided for potable water and in many instances wastewater in the proper selection of the various components as disclosed in this application.

An on-line monitor 30, such as an on-line fluorometer, may be coupled to cell 1. This instrument measures the primary fluorescence of the passing water in a selected emission spectral band, such as 460 nm. This measurement provides an indication of the total microbial population density. This density in turn is a measure of the microbial contamination of the water based on the known relationship between NADH fluoresence and microbial density population. The monitor is preferably coupled to a controller 32 and which controls current density. As the water flows through the cell unit 1, the water is subjected to the electroionic treatment established by the energization of the electrodes and the conductivity of the water. The biocidal effect of the ionic treatment generated within the water on the bacteria effectively destroys or inactivates such bacteria and other microorganisms or at least reduces the level to that acceptable for drinking water standards. Alternatively, it will treat wastewater similarly to reduce microbial contamination to a level permitting direct discharge into a receiving body of water.

Pilot Plant Testing

Pilot plant testing of a system based on the algorithmic design process as shown in FIG. 5 and described above has established the exceptional results within the teaching of the present invention, particularly using either stainless steel or copper electrode.

| Date | Initial TC* c/100 ml | Initial EC* c/100 ml | Final TC c/100 ml | Final EC c/100 ml | Current (ma) | Voltage (volts) |
|---|---|---|---|---|---|---|
| Stainless Steel Electrodes | | | | | | |
| 10/5 | 4300 | 2400 | 70 | 6 | 500.0 | 22.2 |
| 10/10 | 3600 | 2100 | 3 | 0 | 500.0 | 21.9 |
|  | 3600 | 2100 | 2 | 0 | 250.0 | 13.0 |
| Copper Electrodes | | | | | | |
| 10/15 | 1500 | 400 | 0 | 0 | 107.0 | 9.3 |
|  | 1500 | 400 | 1 | 0 | 154.0 | 12.8 |
|  | 1600 | 500 | 14 | 0 | 50.0 | 3.8 |
|  | 1600 | 500 | 25 | 0 | 25.0 | 2.6 |
| 11/7 | 2300 | 1400 | 5 | 0 | 101.5 | 8.5 |
|  | 2300 | 1400 | 110 | 0 | 25.3 | 1.8 |
|  | 2200 | 1500 | 240 | 5 | 10.3 | 1.2 |

| Date | Initial TC* c/100 ml | Initial EC* c/100 ml | Final TC c/100 ml | Final EC c/100 ml | Current (ma) | Voltage (volts) |
|---|---|---|---|---|---|---|
| Copper Electrodes | | | | | | |
| 10/15 | 1500 | 400 | 0 | 0 | 107.0 | 9.3 |
|  | 1500 | 400 | 1 | 0 | 154.0 | 12.8 |
|  | 1600 | 500 | 14 | 0 | 50.0 | 3.8 |
|  | 1600 | 500 | 25 | 0 | 25.0 | 2.6 |
| 11/7 | 2300 | 1400 | 5 | 0 | 101.5 | 8.5 |
|  | 2300 | 1400 | 110 | 0 | 25.3 | 1.8 |
|  | 2200 | 1500 | 240 | 5 | 10.3 | 1.2 |

Cudahy, Wis. Surface Water Testing

Bench Testing

Test Environment:

Water Conductivity: 300–500 uS/cm

Flow Rate: 100 ml/min

Voltage: See below.
Current: See below.
Input: treated Lake Michigan water prior to chlorination

| | Copper Electrodes | | | | |
|---|---|---|---|---|---|
| Date | Initial TC* c/100 ml | Initial EC* c/100 ml | Final TC c/100 ml | Final EC c/100 ml | Current (ma) | Voltage (volts) |
| 10/19 | 120 | 42 | 0 | 0 | 10.1 | 17.1 |
|  | 120 | 42 | 0 | 0 | 15.3 | 29.3 |
|  | 250 | 10 | 0 | 0 | 20.2 | 33.1 |
| 10/22 | 260 | 80 | 0 | 0 | 5.3 | 9.6 |
|  | 270 | 80 | 3 | 0 | 2.2 | 4.5 |

TC - Total Coliform, initial and Final.
EC - *E. coli* bacteria, initial and Final.

The illustrated embodiments disclose preferred constructions. Other embodiments are included within the teachings in the claims in this application and can be provided by those skilled in the art based on the teaching of the necessary approaches and considerations as discussed in this application. For example, the plate-like electrodes may be formed in other than a single integral plate or flat-like member. For example, the plates may be replaced with a series of relatively larger or small surface members to define spaced surfaces connected to the power system and subjected to flowing water to generate the ionic state between the individual plates or other shaped elements. A basic requirement of the present invention is to provide for the electrode surfaces with sufficient surface area to allow for the required contact time during the high rates of flow, as herein before discussed. Although flat plate-like members are preferred, disbursed rod-like members defining passageways between which the water flows and providing sufficient contact surface may be used to produce and establish the necessary ionic flow at the high rates of the water flow.

We claim:

1. A disinfection apparatus for disinfection of wastewater and/or potable water, the disinfection apparatus comprising:
   an electrolytic flow cell including at least two spaced apart electrodes positioned in a flow line of a dynamic flow system which operates at high flow rates in large pipes and open channels through which wastewater and/or potable water passes the therethrough;
   a DC power supply coupled to a polarity switching circuit and connected to said electrodes, said power supply operable to create an ionic current flow between said electrodes and operable to create a current density for disinfection of the wastewater and/or potable water;
   an ultrasonic generator coupled to said electrodes;
   an on-line microbial fluorometric monitor coupled to the input and output of said flow cell with sensors in said flow line to detect and quantify the total microbial population density of said wastewater and/or potable water;
   a flow meter coupled to said flow line;
   a power supply controller coupled to said power supply and receiving inputs from said on-line microbial fluorometric monitor and said flow meter for adjusting the power output level of said power supply, minimizing electric power consumption.

2. The disinfection apparatus of claim 1 wherein said electrodes have contact surfaces formed of material selected from a group consisting of iron, iron alloy, stainless steel, carbon and copper.

3. The disinfection apparatus of claim 1 wherein said power supply provides voltages in the range of 1–200 volts and establishes currents in the range of 1–6 amperes.

4. The disinfection apparatus of claim 1 wherein said power supply provides current densities in the range of 0.2–200.0 ma/cm$^2$.

5. The disinfection apparatus of claim 1 wherein said wastewater and/or potable water contains oxygen and said ionic current flow generates hydrogen peroxide in said wastewater and/or potable water.

6. The disinfection apparatus of claim 1 wherein said ultrasonic generator is a low frequency ultrasonic transducer coupled to said electrodes to sonicate said electrodes and said wastewater and/or potable water.

7. The disinfection apparatus of claim 6 wherein said ultrasonic traducer operates within the range of 15 kHz to 50 kHz.

8. The disinfection apparatus of claim 6 wherein said ultrasonic transducer is an ultrasonic piezoelectric converter coupled to said electrodes.

9. The disinfection apparatus of claim 1 wherein said electrodes are opposed extended sheet electrodes mounted in aligned spaced relation to define spaced walls of a pipe or an open channel with said wastewater and/or potable water flowing between said electrodes.

10. The disinfection apparatus of claim 1 wherein said power supply connected to said electrodes generates hydrogen peroxide in said wastewater and/or potable water.

11. The disinfection apparatus of claim 1 wherein said power supply connected to said electrodes generates hydroxyl radicals in said wastewater and/or potable water.

12. The disinfection apparatus of claim 1 wherein said electrodes are made of copper with the flow cell length in accordance with a specified ionic copper concentration to maintain the copper ion concentration in said wastewater and/or potable water within predetermined regulatory limits.

13. The disinfection apparatus of claim 1 wherein said electrodes are formed of copper having a length for establishing an extended contact time to said power supply for establishing a lower current density and thereby a low copper concentration in said wastewater and/or potable water within predetermined regulatory limits.

14. The disinfection apparatus of claim 13 further comprising a monitoring means for monitoring the level of copper concentration in said wastewater and/or potable water passing through said electrodes.

15. The disinfection apparatus of claim 1 wherein said power supply is a switched bipolar DC power supply.

16. The disinfection apparatus of claim 1 wherein said switching circuit provides for alternating polarity potential created between said electrodes.

17. The disinfection apparatus of claim 1 wherein the polarity of said DC power supply is switched at a certain frequency.

18. The disinfection apparatus of claim 1 wherein said electrodes conform to the shape of said flow line and constitute outer walls of said flow line with said wastewater and/or potable water flowing through said flow cell engaging and filling the space between said electrodes.

19. The disinfection apparatus of claim 1 wherein said electrodes have a length in the flow direction determined by the flow rate of the wastewater and/or potable and the conductivity of said wastewater and/or potable water.

20. The disinfection apparatus of claim 1 wherein said power supply establishes a potential at said electrodes for establishing a current density in said wastewater and/or potable water sufficient to reduce the microbial population to a specified level.

21. The disinfection apparatus of claim 20 wherein said specified level is at least 200 colony forming units (CFUs)/100 ml for wastewater.

22. The disinfection apparatus of claim 20 wherein said specified level is at least 1 CFU/100 ml for potable water.

23. The disinfection apparatus of claim 1 wherein said wastewater and/or potable water is treated at a rate as high as 100 million gallons per day in pipe diameters or channel widths as large as 8 feet.

24. An electroionic disinfection apparatus for disinfecting water including wastewater and/or potable water, the electroionic disinfection apparatus comprising:
   an electroionic flow cell including at least two spaced apart electrodes positioned in a flow line including a pipe or open channel through which said water passes therethrough;
   a DC power supply coupled to a polarity switching circuit and connected to said electrodes;
   an ultrasonic generator coupled to said electrodes;
   an on-line microbial fluorometric monitor coupled to the input and output of said flow cell with sensors in said flow line;
   a flow meter coupled to said flow line; and
   a power supply controller coupled to said power supply and receiving inputs from said on-line microbial fluorometric monitor and said flow meter.

25. The electroionic disinfection apparatus of claim 24 wherein said power supply creates an ionic current flow between said electrodes and creates a current density for disinfection of said water.

26. The electroionic disinfection apparatus of claim 24 wherein said on-line microbial fluorometric monitor detects and quantifies the total microbial population density of said water.

27. The electroionic disinfection apparatus of claim 24 wherein said power supply controller adjusts the power output level of said power supply, minimizing electric power consumption.

28. The electroionic disinfection apparatus of claim 24 wherein said power supply connected to said electrodes generates hydrogen peroxide in said water.

29. The electroionic disinfection apparatus of claim 24 wherein said power supply connected to said electrodes generates hydroxyl radicals in said water.

30. A method for electroionically disinfecting water including wastewater and potable water, the method comprising the steps of:
   passing said water through a passageway having opposed electrodes forming opposed outer walls of said passageway;
   supplying a switched bipolar DC voltage across said electrodes for establishing a current flow between said electrodes;
   connecting an ultrasonic generator to said electrodes;
   connecting an on-line microbial fluorometric monitor between the input and output of said passageway;
   connecting a flow meter to said passageway; and
   coupling a power supply controller to said power supply and receiving inputs from said on-line microbial fluorometric monitor and said flow meter.

31. The electroionic disinfection apparatus of claim 30 wherein said step of connecting an ultrasonic generator to said electrodes sonicates said electrodes and said water.

32. The method for electroionically disinfecting water of claim 30 wherein said step of connecting said on-line microbial fluorometric monitor between the input and output of said passageway detects and quantifies the total microbial population density of said water.

33. The method for electroionically disinfecting water of claim 30 wherein said step of coupling said power supply controller to said power supply and receiving inputs from said on-line microbial fluorometric monitor and said flow meter said power supply controller adjusts the power output level of said power supply, minimizing electric power consumption.

34. The method for electroionically disinfecting water of claim 30 further comprising the step of generating hydrogen peroxide in said water.

35. The method for electroionically disinfecting water of claim 30 further comprising the step of generating hydroxyl radicals in said water.

* * * * *